United States Patent [19]

Luggenhorst et al.

[11] Patent Number: 6,030,433

[45] Date of Patent: *Feb. 29, 2000

[54] METHOD FOR EXTRACTING METALS FROM METAL-CONTAINING MATERIALS BY PYROHYDROLYSIS

[75] Inventors: Hendrik Jan Luggenhorst, Holten; Edgar Manfred Lawrence Peek, Krimpen aan de Ijssel, both of Netherlands

[73] Assignee: Nederlandse Organisatie Voor Toegepast-Natuurwetenschappelijk Onderzoek (TNO), Delft, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,342

[22] PCT Filed: Jun. 1, 1995

[86] PCT No.: PCT/NL95/00185

§ 371 Date: Feb. 5, 1997

§ 102(e) Date: Feb. 5, 1997

[87] PCT Pub. No.: WO95/33686

PCT Pub. Date: Dec. 14, 1995

[30] Foreign Application Priority Data

Jun. 8, 1994 [NL] Netherlands ............................ 9400929

[51] Int. Cl.$^7$ ............................... C01G 1/06; C01G 9/04; C22B 7/00

[52] U.S. Cl. .................................. 75/658; 75/694; 75/961; 423/38; 423/87; 423/91; 423/97; 423/107; 423/108

[58] Field of Search ................. 423/97, 107, 108, 423/38, 87, 91; 75/694, 657, 658, 961

[56] References Cited

U.S. PATENT DOCUMENTS

| | | | |
|---|---|---|---|
| 5,004,496 | 4/1991 | Aune et al. | 75/961 |
| 5,245,120 | 9/1993 | Srinivasachar et al. | 588/256 |
| 5,556,447 | 9/1996 | Srinivasachar et al. | 75/670 |

*Primary Examiner*—Melvyn Andrews
*Attorney, Agent, or Firm*—Young & Thompson

[57] ABSTRACT

A method for extracting metals from metal-containing materials, especially waste, by pyrohydrolysis. The metal-containing materials which contain at least one or more of the metals from the group consisting of Zn, Cd, Pb, Hg, Cu, Sn (as Sn(0) and Sn(II)), As, Sb, Au, Ag and Bi, are made to react at 700–1100° C., advantageously 800–900° C., with a gas composition which at least comprises 25–45% by volume of water vapor, 0–12% by volume of carbon dioxide, 2–20% by volume of hydrogen chloride, 0–15% by volume of carbon monoxide, the remainder being nitrogen and possibly oxygen. The metals from the above-mentioned group are extracted in the form of volatile metal chlorides. More particularly, metal-containing materials are used which also contain one or more metals from the group consisting of Fe, Cr, Mn, Ni, Mg, Ca, Al, Si, Ti, Co and Zr, this last group of materials being hydrolysed, under the reaction conditions, to give non-volatile metal oxides, or remain, in the oxidic form, or form (2) a non-volatile metal chloride and therefore remain behind in the starting material.

8 Claims, 1 Drawing Sheet

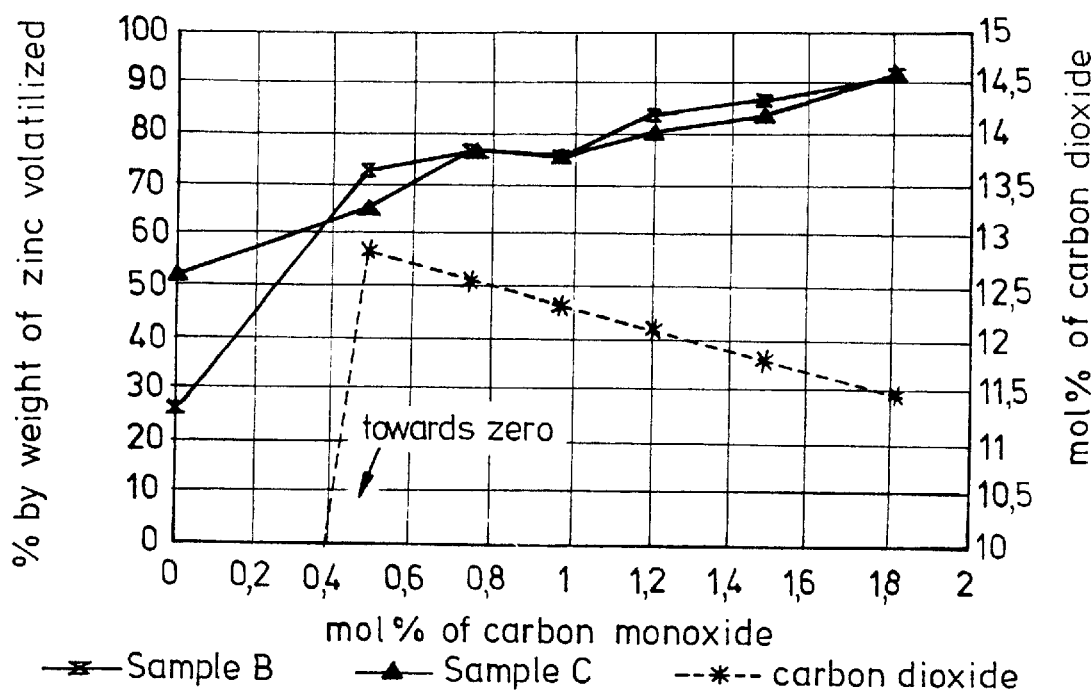
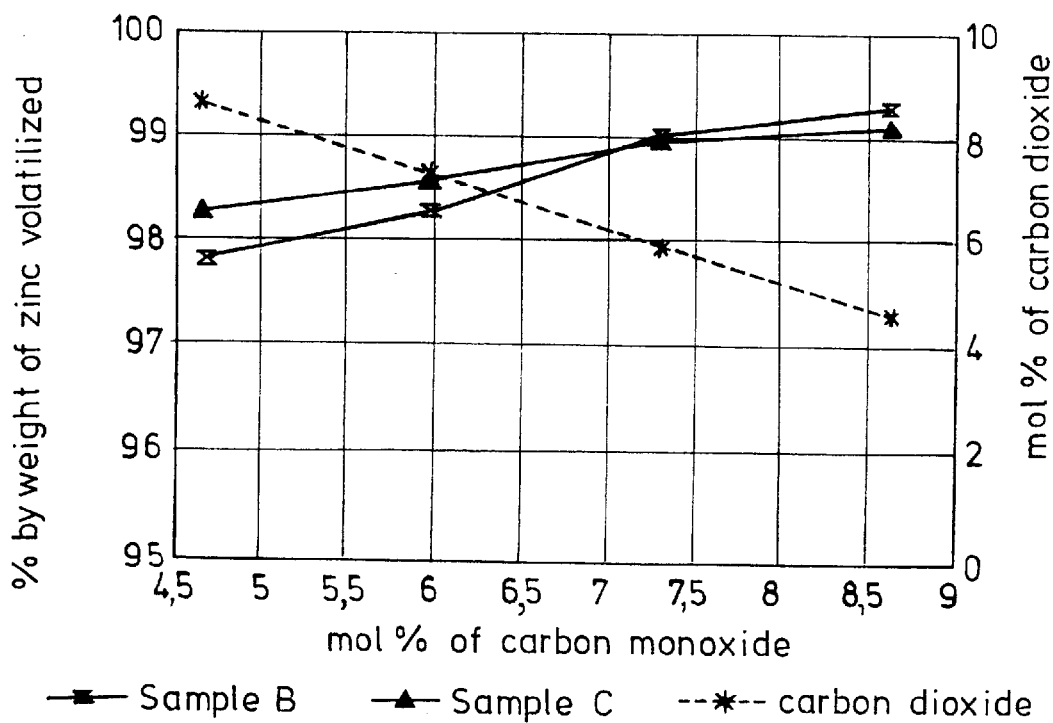

METHOD FOR EXTRACTING METALS FROM METAL-CONTAINING MATERIALS BY PYROHYDROLYSIS

FIELD OF THE INVENTION

The invention relates to a method for extracting metals from metal-containing materials, especially waste.

BACKGROUND OF THE INVENTION

As is well known, metal-containing waste forms a serious environmental problem. This is particularly true of waste in which the presence of heavy metals which can be leached relatively rapidly, such as cadmium, lead and zinc, entails a potential environmental hazard. Moreover, the metal-containing waste materials form a very heterogeneous group of materials which comprises, inter alia, metal-containing muds, sludges, filter cakes, metal and filter dusts, batteries, accumulators, printing plates, composites, laminates, catalysts and pickling fluids from, e.g., the electroplating industry. Such waste materials show very large differences among themselves with respect to physical appearance and composition (type and content of the metals and minor components present). Depending on the type of waste and the source, in the Netherlands alone this involves many tonnes up to tens of thousands of tonnes per metal-containing waste product per year.

Out of the abovementioned enormous amount of metal-containing waste materials, only 5%, according to estimates, are being worked up in metal recovery processes. This processed portion of the metal-containing waste materials primarily involves waste materials having a (very) high content of valuable metals and a low content of minor components, such as scrap iron, scrap zinc, scrap lead and cabling waste (recovery of copper). By far the greater part of the metal-containing waste materials is therefore dumped, either on the operator's own plant site or at a dump suitable for this purpose.

In principle, two routes are available for processing complex metal-containing waste materials, namely: [1] the hydrometallurgical route and [2] the pyrometallurgical route. Both techniques are used for producing metals from primary raw materials (ores). With respect to processing most metal-containing waste materials, however, these conventional hydro- and pyrometallurgical processes do not always provide the direct answer, since:

- the waste materials, in terms of complexity regarding physical properties and chemical composition, differ from natural ores;
- waste materials may contain combinations of metals which do not occur in natural ores;
- waste materials may contain components which have an adverse effect on the hydro- and pyrometallurgical processes, and
- virtually all metals including iron are brought into solution, which latter product needs to be removed in the subsequent process, which requires a large amount of chemicals and often affords an iron product which should be regarded as a hazardous waste.

Given the major need for an effective reprocessing method for metal-containing waste, Applicant has therefore carried out in-depth research regarding a uniformly applicable method for extracting (at least part of) the metals from the multitude of metal-containing waste materials.

SUMMARY OF THE INVENTION

Surprisingly it was found that the abovementioned object can be achieved if metal-containing materials which contain at least one or more of the metals from the group consisting of Zn, Cd, Pb, Hg, Cu, Sn (as Sn(0) and Sn(II)), As, Sb, Au, Ag and Bi, are made to react at 700–1100° C. with a gas composition which at least comprises 25–45% by volume of water vapour, 0–12% by volume of carbon dioxide and 2–20% by volume of hydrogen chloride, and the metals from the abovementioned group are extracted in the form of volatile metal chlorides.

The pyrohydrolysis according to the invention is based on the principle that, under the process conditions indicated above, the metals Zn, Cd, Pb, Hg, Cu, Sn (as Sn(0) and Sn(II)), Au, Ag, As, Sb and Bi, are converted into volatile metal chlorides and can therefore on this basis be removed from the raw material or waste material, and other metals such as Fe, Cr, Mn, Ni, Kg, Ca, Al, Si, Ti, Co and Zr remain in the oxidic form or are converted into metal oxides or non-volatile metal chlorides which, under the abovementioned process conditions, are not volatile and therefore remain behind in the starting material.

On the basis of the above it is therefore possible, according to the invention, to effect a separation between, on the one hand, metals which under the reaction conditions are converted into volatile metal chlorides and, on the other hand, metals which under these conditions remain non-volatile metal oxides or are converted thereto or are converted into non-volatile metal chlorides. It is worth mentioning that metals which have a strong tendency to form metal oxides and therefore remain in the residue can sometimes be used in, inter alia, the production of building materials and in the steel industry and, depending on the specifications of the metal oxide, also for specific applications such as, for example, the manufacture of permanent magnets. The residue can therefore be reused in a useful manner and need not be regarded as hazardous waste. At the same time, the metals collected as volatile metal chlorides can be used for a variety of purposes, either as such or after further processing and, if appropriate, separation from one another by means of hydrometallurgical techniques such as solvent extraction, precipitation, cementation, ion exchange and electrodeposition.

With respect to the pyrohydrolysis process it should be noted that this process per se is already being used for recovering hydrochloric acid from iron-containing pickling acid and for preparing pure metal oxides such as nickel oxide and magnesium oxide. More particularly, the article "The Regeneration of Hydrochloric acid from Waste Pickle Liquor using the Keramchemie/Lurgi Fluidized-Bed Reactor System" Canadian Mining and Metallurgical Bulletin, February 1975, pp. 89–93, in particular p. 90, represents the conversion of iron chloride, present in pickling acid, into iron oxide by the equation:

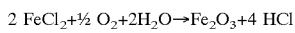

$$2\ FeCl_2 + \tfrac{1}{2}\ O_2 + 2H_2O \rightarrow Fe_2O_3 + 4\ HCl$$

Such an HCl regeneration can be carried out not only by means of a fluidized bed, but also via a "spray-roaster" process as described in the article "Hydrochloric Acid Regeneration as Applied to the Steel and Mineral Processing Industries", Canadian Mining and Metallurgical Bulletin, February 1975, pp. 1–7.

Moreover, in Physical Chemistry of Extractive Metallurgy, Proceedings of an International Symposium . . . held as the AIME Annual Meeting, New York, N.Y., Feb. 24–28, 1985, the article "Pyrohydrolysis of Nickel Chloride Solution in a 30-inch diameter Fluidized-bed Reactor", Jha C. S. et al. gives a description of a pyrohydrolysis reaction involving nickel chloride, nickel oxide being obtained according to the equation $NiCl_2 + H_2O \rightarrow NiO + 2HCl$.

With respect to the abovementioned literature it is emphasised that none of the pyrohydrolysis processes discussed above is used to effect separation from each other of metals which belong to the abovementioned two groups or, as the case may be, to achieve extraction of metals which can be volatilized to form chlorides, from waste materials containing these metals.

As indicated above, the invention relates to the extraction of metals from metal-containing materials, in particular from wastes such as e.g. mixtures of metals and plastics, electric-furnace dust, cupola dust and shredder dust.

With respect to the temperature employed in the pyrohydrolysis according to the invention it is pointed out that the temperature is preferably in the range of 800–900° C. Concerning the lower limit of 800° C., attention is drawn to the fact that at 800° C. or higher the formation of toxic organochlorine compounds such as PCBs and PAHs, which are formed especially in the temperature range of 200–400° C., and likewise that of dioxins and furans will not or virtually not take place. The preferably maintained upper limit of 900° C. is primarily applied on economic grounds.

The hydrogen chloride content in the pyrohydrolysis gas is, as indicated above, 2–20% by volume. Although a lower HCl content is possible in principle, in practice this usually results in a decrease of the removal rate of metals which can be volatilized to form chlorides. A high HCl content in the pyrohydrolysis gas, of more than 20% by volume, does result in an improvement of the reaction rate in a general sense, as would be expected, but this is as yet not seen as worthwhile, since the selectivity of the separation is generally lost, i.e. even the metal oxides regarded as stable then exhibit the tendency to be volatilized as metal chloride. Attention is drawn in this context to the reactions of lead and cadmium with HCl which proceed very rapidly at an HCl concentration of as low as 2.5% by volume.

With respect to the water vapour content of the pyrohydrolysis gas it is further pointed out that this may vary within a wide range. For practical considerations, however, the range has been set to 25–45% by volume, although the reaction can also be carried out below 25% by volume and above 45% by volume. More in particular, it should be noted in this context that the presence of water vapour affects the selectivity of the reaction. The fact is that an increase in the water vapour concentration makes it possible for metals which, at a low water vapour concentration, evaporate as chlorides to be converted into oxide after all or, as the case may be, to remain in the oxidic form. Lowering the water vapour concentration in the pyrohydrolysis gas has the opposite effect, since in that case more metals are converted into volatile chlorides.

With respect to the pyrohydrolysis gas it is pointed out, for the sake of completeness, that the remaining fraction of the gas is formed by nitrogen gas which can be supplemented, as required, with oxygen and/or other gases. In practice, oxygen is present in the reaction gas for the purpose of the pyrohydrolysis reaction and for the combustion of natural gas or another fuel. Depending on the ratio air/fuel, a variable oxygen level may be present after the combustion. The tube furnace experiments have shown that oxygen does not have an adverse affect on the separation of metals. The pyrohydrolysis of ferrous chloride, however, encounters problems if more than approximately 2% by volume of oxygen is present, owing to the oxidation of ferrous chloride to give the not readily hydrolyzable ferric chloride. Therefore, the oxygen content in the case of ferrous chloride should be kept as low as possible, preferably below 1% by volume. With other reactions, the oxygen concentration can be between 0 and 8% by volume.

In contrast to oxidizing conditions it is also possible to create reductive conditions in the pyrohydrolysis gas. Both carbon monoxide and hydrogen may be considered as suitable reductants. It was found, surprisingly, that even low concentrations of CO, varying from 0 to 15% by volume, preferably from 0.2 to 5% by volume considerably accelerate the volatilization of metal chlorides, for example zinc chloride, without the valency of the metals present in the chlorides changing or the metals being reduced. For example, zinc remains bivalent and is therefore not reduced.

The residence time of the metal-containing waste material under the pyrohydrolysis conditions principally depends on the reaction rate between the HCl and the metals and metal compounds which can be volatilized to form chlorides, and therefore also on the type of waste. Such residence times may vary from, for example, 0.1 hour in the case of, for example, a lead-containing waste material up to a number of hours, for example 5 hours. The residence time also depends on the removal efficiency desired for the metals to be removed.

The method according to the invention can be implemented in a variety of devices such as a tube furnace or a rotary furnace. Advantageously, the method can be implemented in a fluidized-bed reactor, particularly if the waste materials can be fed to the reactor in a fine suspension, since the fuel consumption can thereby be reduced. A further advantage of employing a suspension of waste materials is that a much higher "metal concentration" can be used than if all the waste materials first have to be dissolved and be passed to the reactor via the liquid phase. This is because, in the case of a suspension, much less liquid has to be evaporated in the system per tonne of solid produced, resulting in a significant energetic advantage being achieved.

The metals obtained according to the invention and volatilized as chlorides can be collected as exhaust gas and be processed, as an acidic solution of metal chlorides, according to the methods known from the prior art such as solvent extraction, precipitation, cementation and electrodeposition. The hydrochloric acid which is present in the exhaust gas can be reused, after condensation and absorption, for preparing the feed for the pyrohydrolysis reactor.

BRIEF DESCRIPTION OF THE DRAWINGS

FIG. 1: Graphic representation of the removal of zinc from synthetic zinc ferrite at various carbon monoxide (0–2% by volume) and carbon dioxide concentrations in the reaction gas.

FIG. 2: Graphic representation of the removal of zinc from synthetic zinc ferrite at various carbon monoxide (4.5–9% by volume) and carbon dioxide concentrations in the reaction gas.

DETAILED DESCRIPTION OF THE INVENTION

The method according to the invention is explained in more detail with reference to the following examples. These examples should not, however, be interpreted as limiting the scope of the invention.

EXAMPLE I

An amount of 2 g of waste material A containing the most important metals stated below in Table A

TABLE A

| Element | |
|---|---|
| Iron (%) | 19.1 |
| Zinc (%) | 15.2 |
| Lead (%) | 2.17 |

Fe, Zn and Pb being present as the oxide, as well as a small amount of Ca, Al, Mg, Si as the oxides and Na as the chloride was exposed, in a tube reactor having an internal diameter of 28 mm, at a temperature of 827° C., for 60 minutes, to a standard pyrohydrolysis gas of 35% by volume of water vapour ($H_2O$), 6% by volume of carbon dioxide ($CO_2$), 7.5% by volume of hydrogen chloride (HCl) and 51.5% by volume of nitrogen ($N_2$).

Apart from the standard pyrohydrolysis gas, other gas compositions as shown in Table B were used, with the proviso that an increase or decrease of any gas component was linked to the decrease or increase of the nitrogen content of the gas. Table B also illustrates the results obtained at different residence times and different pyrohydrolysis temperatures, respectively.

TABLE B

| Test | Zn (%)* | Rem (%)** | Pb (ppm)* | Rem (%)** |
|---|---|---|---|---|
| Standard | 2.05 | 90.77 | 574 | 98.19 |
| 2.5 mol % HCl | 9.26 | 51.59 | 769 | 97.18 |
| 12.5 mol % HCl | 0.09 | 99.65 | 382 | 98.95 |
| Residence time 30 min | 2.76 | 86.68 | 721 | 97.56 |
| Residence time 120 min | 0.179 | 99.33 | 423 | 98.90 |
| T = 727° C. | 8.3 | 54.07 | 1150 | 95.54 |
| with 4 mol % of CO | 1.37 | 94.37 | 282 | 99.19 |
| with 10 mol % of CO | 1.92 | 92.14 | 192 | 99.45 |

*Content of the metal left behind in the treated starting material.
**Rem = removal efficiency, calculated on the basis of the amount of metal present in the starting material.

EXAMPLE II

A sample of 2 grams of waste material A was treated in a tube furnace having an internal diameter of 28 mm, with the aid of pyrohydrolysis in order to remove the lead and zinc present, the following process conditions being employed:

| | | |
|---|---|---|
| Gas composition: | water vapour ($H_2O$) | 35% by volume |
| | carbon dioxide ($CO_2$) | 6% by volume |
| | hydrogen chloride (HCl) | 7.5% by volume |
| | nitrogen ($N_2$) | 51.5% by volume |
| Temperature: | | 827° C. |
| Residence time: | | 60 min |

The abovementioned experiment was carried out in duplicate, the following removal efficiencies being achieved:

| | Removal of zinc (%) | Removal of lead (%) |
|---|---|---|
| Experiment (1) | 82.7 | 97.4 |
| Experiment (2) | 84.8 | 97.7 |

EXAMPLE III

An amount of 2 g of waste material B having the following composition,

TABLE C

| Element | |
|---|---|
| Iron (%) | 41.6 |
| Zinc (%) | 0.89 |
| Calcium (%) | 15.7 |
| Lead (%) | 0.22 |
| Aluminium (%) | 0.18 |
| Magnesium (%) | 0.52 |
| Silicon (%) | 2.15 |
| Sodium (%) | 0.21 |
| Chlorine (%) | 0.06 |
| Carbon (%) | 1.61 |
| Dry substance content | 82.3 | all the metals being present as hydroxide or oxide and sodium as the chloride, was exposed, in a tube reactor having an internal diameter of 28 mm, at a temperature of 827° C., for 60 minutes, to a standard pyrohydrolysis gas of 35% by volume of water vapour ($H_2O$), 6% by volume of carbon dioxide ($CO_2$), 7.5% by volume of hydrogen chloride (HCl) and 51.5% by volume of nitrogen ($N_2$).

Apart from the standard pyrohydrolysis gas, other gas compositions as shown in Table D were used, with the proviso that an increase or decrease of any gas component was linked to the decrease or increase of the nitrogen content of the gas. Table D also illustrates the results obtained at different residence times and different pyrohydrolysis temperatures, respectively.

TABLE D

| Test | Zn (%)* | Rem (%)** | Pb (ppm)* | Rem (%)** |
|---|---|---|---|---|
| Standard | 0.51 | 42.7 | <40 | 98.18 |
| 2.5 mol % HCl | 0.75 | 15.73 | 125 | 94.32 |
| 12.5 mol % HCl | 0.31 | 65.17 | 55 | 97.50 |
| Residence time 30 min. | 0.38 | 57.30 | 28 | 98.73 |
| Residence time 120 min. | 0.23 | 74.16 | 64 | 97.10 |
| T = 727° C. | 0.53 | 40.45 | 146 | 93.36 |
| T = 927° C. | 0.32 | 64.04 | 20 | 99.09 |
| with 5 mol % of CO | 0.23 | 74.16 | 84 | 96.18 |
| with 10 mol % of CO | 0.26 | 70.78 | 71 | 96.77 |

*Content of the metal left behind in the starting material.
**Rem = removal efficiency, calculated on the basis of the amount of metal present in the starting material.

EXAMPLE IV

A sample of 2 grams of the waste material B employed in Example III was treated in a tube furnace having an internal diameter of 28 mm, with the aid of pyrohydrolysis, in order to remove the lead and zinc present therein, the following process conditions being employed:

| Gas composition: | water vapour (H$_2$O) | 35% by volume |
| --- | --- | --- |
| | carbon dioxide (CO$_2$) | 6% by volume |
| | carbon monoxide (CO) | 2.5% by volume |
| | hydrogen chloride (HCl) | 10% by volume |
| | nitrogen (N$_2$) | 46.5% by volume |
| Temperature: | | 827° C. |
| Residence time: | | 60 min |

The abovementioned experiment was carried out in duplicate, the following removal efficiencies being achieved for Zn and Pb:

| | Removal of zinc (%) | Removal of lead (%) |
| --- | --- | --- |
| Experiment (A) | 86.0 | 96.2 |
| Experiment (B) | 82.9 | 95.8 |

EXAMPLE V 2 g of synthetic zinc ferrite (ZnFe$_2$O$_4$) were exposed, in a tube furnace at 827° C. for 1 hour, to a pyrohydrolysis gas of 7.5% by volume of HCl, 35% by volume of H$_2$O and 57.5% by volume of N$_2$. Data with respect to the starting material and the zinc removal efficiency after 1 hour are shown in Table E below.

TABLE E

Characteristic chemical, physical and mineralogical properties of synthetic zinc ferrite

| Chemical composition | % by weight of Zn | % by weight of Fe |
| --- | --- | --- |
| Sample A (atomic absorption spectrometry) | 27.5 | 48.2 |
| Sample B (atomic absorption spectrometry) | 26.3 | 47.6 |
| Sample C (atomic absorption spectromtry) | 25.8 | 47.7 |
| Theoretical composition | 27.1 | 46.3 |

| Physical properties | d$_{50}$ | BET area | % of volatilized Zn |
| --- | --- | --- | --- |
| Sample A | 32 μm | 0.40 m$^2$/g | 45.6 |
| Sample B | 18 μm | 0.69 m$^2$/g | 26.0 |
| Sample C | 13 μm | 0.90 m$^2$/g | 52.2 |
| Mineralogical properties | | | |
| Phases (XRD) | Franklinite (ZnFe$_2$O$_4$) for all three samples | | |

After a reaction period of 4 hours, the amount of volatilized zinc was 99.5% for all the samples shown in Table E, calculated on the basis of the amount of zinc present in the starting material.

EXAMPLE VI 2 g of the zinc ferrite samples B and C used in Example V were exposed, in a tube furnace at 827° C. for 1 hour, to a pyrohydrolysis gas of 7.5% by volume of HCl, 35% by volume of H$_2$O, 12.8% by volume of CO$_2$, 0.5% by volume of CO and 44.2% by volume of N$_2$.

The results obtained in this experiment are illustrated in Table F below.

TABLE F

| | Sample B | Sample C |
| --- | --- | --- |
| Removal efficiency Zn according to Ex. V | 26.0 | 52.2 |
| Removal efficiency Zn according to this example | 72.0 | 66.0 |

It is possible to conclude from the above Table F that as a result of the presence of 0.5% of volume of CO an increase in the zinc removal efficiency was achieved of 175% in the case of Sample B and of 25% in the case of Sample C.

The above experiment was repeated with pyrohydrolysis gases having an altered CO content and CO$_2$ content, respectively, and the results thus obtained are depicted graphically in FIG. 1 and FIG. 2.

EXAMPLE VII 2 g of the zinc ferrite sample C used in Example V were exposed, in a tube furnace at 827° C. for 1 hour, to a pyrohydrolysis gas of 4.67% by volume of CO, 8.67% by volume of CO$_2$, 35% by volume of H$_2$O, 7.5% by volume of HCl, the remainder being N$_2$.

Under these conditions, a virtually complete removal of zinc (>98.0%) was achieved.

EXAMPLE VIII

The method described in Example V was implemented with sample C, with the proviso hat the nitrogen content was reduced for the benefit of the oxygen to be incorporated into the gas mixture.

The results achieved with this experiment are shown in Table G below.

TABLE G

| O$_2$ percentage used in the pyrohydrolysis gas | 0 | 2 | 4 | 8 | 12 |
| --- | --- | --- | --- | --- | --- |
| Zinc removal efficiency achieved in % | 50.5 | 51 | 52.5 | 65 | 67 |

We claim:

1. Method for extracting metals from metal-containing materials, which consists essentially of:

reacting the metal-containing materials at a temperature ranging between 700 and 1100° C. with a gas composition comprising at least 25–45% by volume of water vapor, 0–12% by volume of carbon dioxide, and 2–20% by volume of hydrogen chloride; said metal-containing materials containing:
at least one metal selected from the group consisting of Zn, Cd, Pb, Hg, Cu, Sn (as Sn(0) and Sn(II)), As, Sb, Au, Ag and Bi, and
at least one other metal selected from the group consisting of Fe, Cr, Mn, Ni, Mg, Ca, Al, Si, Ti, Co and Zr; and
extracting said at least one metal in the form of a volatile metal chloride.

2. Method according to claim 1, wherein the reaction is carried out at a temperature ranging between 800–900° C.

3. Method according to claim 1, wherein the reaction is carried out in a fluidized bed.

4. Method according to claim 1, wherein the reaction is carried out with a gas composition which also contains 0–15% by volume of carbon monoxide.

5. Method according to claim 4, wherein the gas composition contains carbon monoxide in an amount ranging from 0.2–5% by volume.

6. Method according to claim 1, wherein the reaction is carried out with a gas composition which also contains 0–8% by volume of oxygen.

7. Method according to claim 1, wherein the metal-containing materials are fed to a reactor in the form of a suspension.

8. Method according to claim 1, wherein the metal-containing materials are zinc-iron-containing waste materials.

* * * * *